(12) United States Patent
Kanno

(10) Patent No.: US 10,795,283 B1
(45) Date of Patent: Oct. 6, 2020

(54) TONER AMOUNT DETECTION DEVICE FOR IMAGE FORMING APPARATUS

(71) Applicant: FUJI XEROX CO., LTD., Tokyo (JP)

(72) Inventor: Makoto Kanno, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/539,413

(22) Filed: Aug. 13, 2019

(30) Foreign Application Priority Data

Mar. 29, 2019 (JP) ................. 2019-066710

(51) Int. Cl.
*G03G 15/08* (2006.01)
*G03G 15/00* (2006.01)

(52) U.S. Cl.
CPC ..... *G03G 15/0856* (2013.01); *G03G 15/0863* (2013.01); *G03G 15/556* (2013.01); *G03G 2215/0695* (2013.01)

(58) Field of Classification Search
CPC .......... G03G 15/0856; G03G 15/0863; G03G 15/0858; G03G 15/5016; G03G 15/556; G03G 2215/0695; G03G 2215/0888; G03G 15/086
USPC .......... 399/12, 27, 61, 81, 258, 263
See application file for complete search history.

(56) References Cited

U.S. PATENT DOCUMENTS 6,154,619 A * 11/2000 Boockholdt ......... G03G 15/553
399/24
6,347,198 B1 * 2/2002 Yamamoto ......... G03G 21/1889
399/27
7,991,308 B2 * 8/2011 Oh ....................... G03G 15/553
399/35
9,291,944 B2 * 3/2016 Shimizu ............. G03G 15/0889
2011/0274443 A1 * 11/2011 Tohata ............... G03G 15/0863
399/12
2012/0033982 A1 * 2/2012 Kubota .............. G03G 15/0856
399/27
2016/0259286 A1 * 9/2016 Akiba ................... G03G 15/55

FOREIGN PATENT DOCUMENTS

| JP | 56150771 A | * 11/1981 | ......... G03G 15/0858 |
| JP | 2004046011 A | * 2/2004 | |
| JP | 2005-221976 A | 8/2005 | |
| JP | 2009-116248 A | 5/2009 | |
| JP | 2010282227 A | * 12/2010 | |
| JP | 2015187660 A | * 10/2015 | |
| JP | 2017122887 A | * 7/2017 | |

* cited by examiner

*Primary Examiner* — Robert B Beatty
(74) *Attorney, Agent, or Firm* — Sughrue Mion, PLLC

(57) ABSTRACT

An image forming apparatus includes a container, a storage unit, a drive unit, a detector, and a determination unit. The container is configured to accommodate toner therein and be detachably mounted on an image forming apparatus main body. The storage unit is configured to store identification information on the toner accommodated in the container, and use history information. The drive unit is configured to rotationally drive a rotation target constituted by the container to transport the toner to an opening provided in an end of the container. The detector is configured to detect a current value of the drive unit. The determination unit is configured to determine a state of the container based on the current value detected by the detector.

14 Claims, 14 Drawing Sheets

FIG.8

| SERIAL ID OF TONER CARTRIDGE | 151 | READING AREA |
|---|---|---|
| TONER COLOR INFORMATION | 152 | |
| INFORMATION ON MODE OF IMAGE FORMING APPARATUS | 153 | |
| INFORMATION ON INITIAL CURRENT VALUE OF DRIVE MOTOR | 154 | READING AND WRITING AREA |
| INFORMATION ON CURRENT VALUE OF DRIVE MOTOR | 155 | |
| NUMBER OF PRINTED SHEETS | 156 | |
| MAIN BODY SERIAL ID OF IMAGE FORMING APPARATUS | 157 | |
| INFORMATION ON MODE CHANGE OF IMAGE FORMING APPARATUS | 158 | |

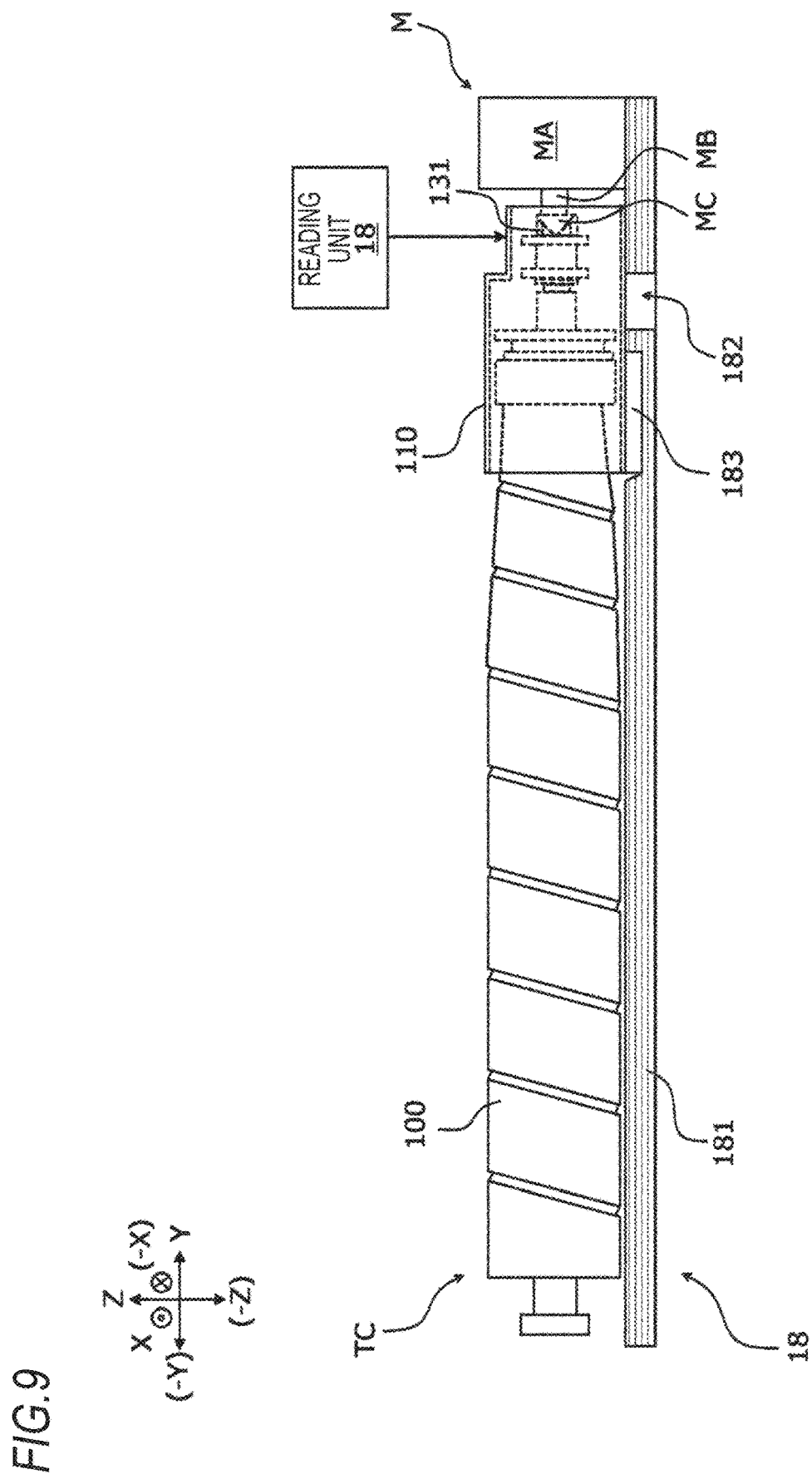

ROTATIONAL DRIVING TORQUE (WEIGHT OF CARTRIDGE)

TONER AMOUNT DETECTION DEVICE FOR IMAGE FORMING APPARATUS

CROSS-REFERENCE TO RELATED APPLICATIONS

This application is based on and claims priority under 35 USC 119 from Japanese Patent Application No. 2019-066710 filed Mar. 29, 2019.

BACKGROUND

(i) Technical Field

The present disclosure relates to an image forming apparatus.

(ii) Related Art

There has been known an image forming apparatus which includes an image carrier, an electrostatic image forming unit that forms an electrostatic image on the image carrier, and a developing unit that supplies an agitated and charged developer to the image carrier, thereby developing the electrostatic image, the image forming apparatus further including a reading unit that reads information on an elapsed time from the manufacturing date of a developer for replenishment, from a storage unit attached to a developer replenishing container that replenishes the developer for replenishment to the developing unit, and a controller that controls the developing unit such that an amount of agitation of the developer increases as the elapsed time becomes longer based on the read information (JP-A-2009-116248).

There has also been known an image forming apparatus which includes a developing tank, a toner replenishing tank that supplies a tonner to the developing tank as necessary, an agitating member that agitates the toner accommodated in the toner replenishing tank, a toner cartridge replaceable with respect to an image forming apparatus main body, and a toner replenishing motor that rotationally drives the agitating member, the image forming apparatus further including a control device that controls the drive of the toner replenishing motor, in which the control device has a function to lower a driving frequency of the toner replenishing motor after an unused cartridge is attached to the image forming apparatus main body (JP-A-2005-221976).

SUMMARY

Aspects of non-limiting embodiments of the present disclosure relate to an image forming apparatus capable of accurately detecting an amount of toner in a toner cartridge, as compared to a configuration in which a detector provided in the toner cartridge detects the amount of toner in the toner cartridge or predicts a remaining amount of the toner at the toner replenishing time.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a container configured to accommodate toner therein and be detachably mounted on an image forming apparatus main body; a storage unit configured to store
identification information on the toner accommodated in the container, and use history information; a drive unit configured to rotationally drive a rotation target constituted by the container to transport the toner to an opening provided in an end of the container; a detector configured to detect a current value of the drive unit; and a determination unit configured to determine a state of the container based on the current value detected by the detector.

BRIEF DESCRIPTION OF THE DRAWINGS

Exemplary embodiment(s) of the present disclosure will be described in detail based on the following figures, wherein:

FIG. 8 is a block diagram of a storage area of an IC tag;

FIG. 9 is a side view illustrating a configuration of the toner cartridge, a toner supply device, and a drive motor;

DETAILED DESCRIPTION

Figure 1:
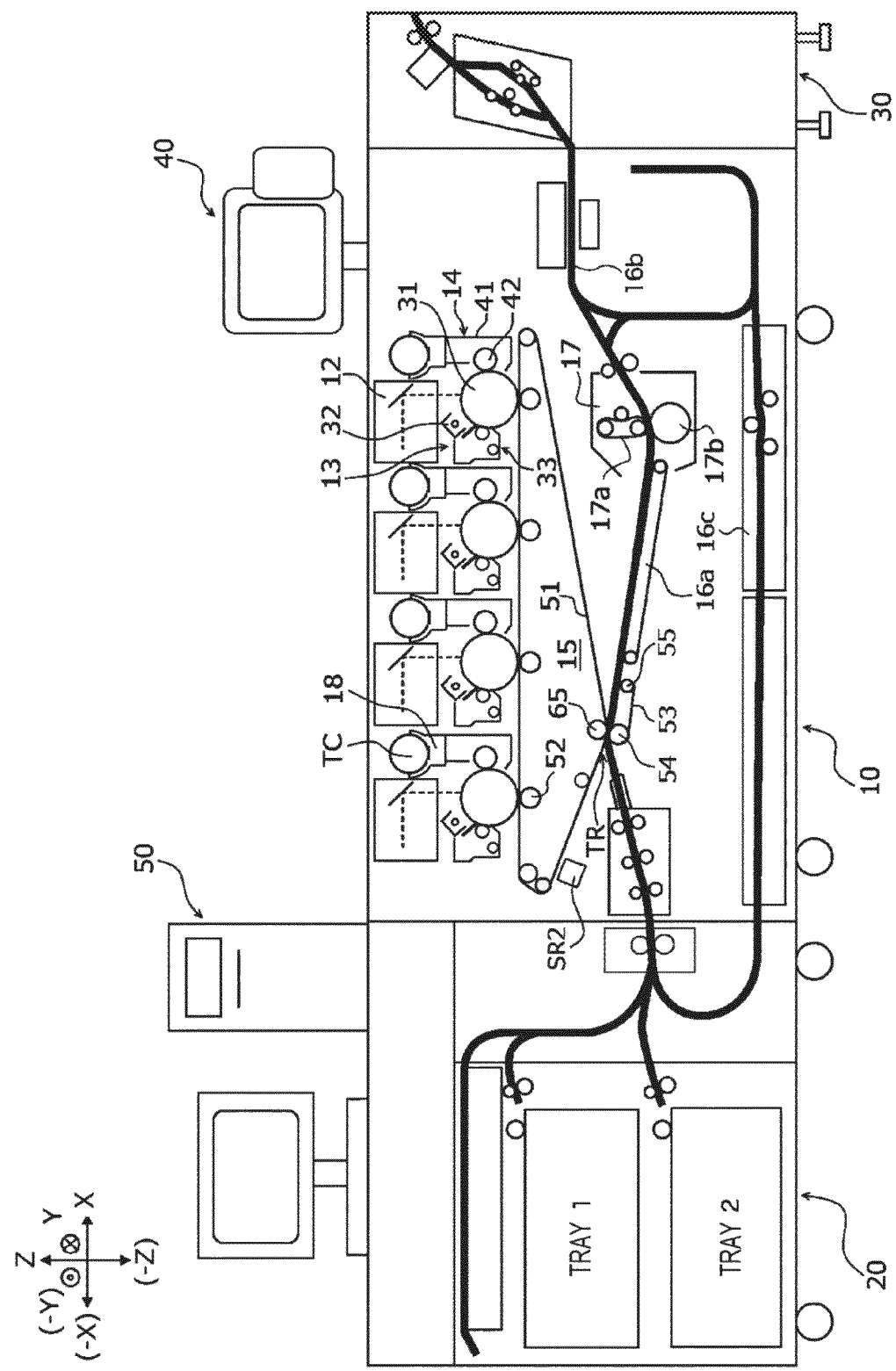
FIG. 1 is a schematic cross-sectional view illustrating a schematic configuration of an image forming apparatus.

Next, the present disclosure will be described below in more detail by way of exemplary embodiments and specific examples with reference to the accompanying drawings, but the present disclosure is not limited to these exemplary embodiments and specific examples.

Further, in the following description using the drawings, it should be noted that the drawings are schematic and that, for example, the ratio of each dimension is different from an actual one, and for easy understanding, illustration other than members necessary for description is appropriately omitted.

Furthermore, in order to facilitate the understanding of the following description, in the drawings, the front-and-rear direction is referred to as the X-axis direction, the left-and-right direction is referred to as the Y-axis direction, and the vertical direction is referred to as the Z-axis direction.

Figure 2:
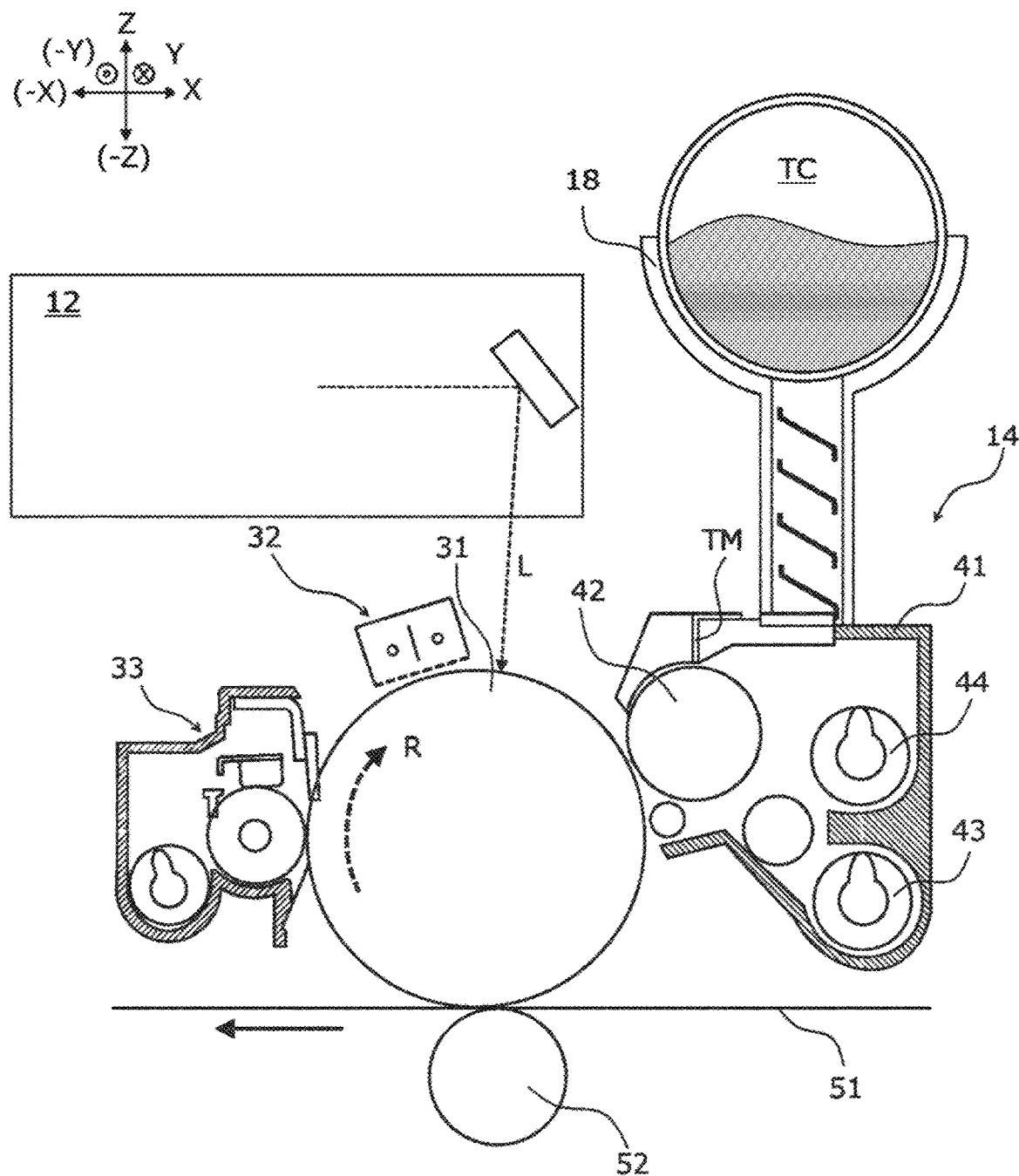
FIG. 2 is a schematic longitudinal cross-sectional view illustrating a configuration of major parts of an image forming unit.

First Exemplary Embodiment (1) Overall Configuration and Operation of Image Forming Apparatus (1.1) Overall Configuration of Image Forming Apparatus FIG. 1 is a schematic cross-sectional view illustrating an example of a schematic configuration of an image forming apparatus 1 according to the present exemplary embodiment. FIG. 2 is a schematic longitudinal cross-sectional view illustrating a configuration of major parts of an image forming unit 10.

The image forming apparatus 1 includes the image forming unit 10, a sheet feeding device 20 mounted at one end of the image forming unit 10, a sheet ejection unit 30 provided at the other end of the image forming unit 10, from which a printed sheet is ejected, an operation display 40, and an image processor 50 which generates image information from printing information transmitted from a host device.

The image forming unit 10 includes a system control device 11 (not illustrated: see FIG. 7), an exposure device 12, a photoconductor unit 13, a developing device 14, a transfer device 15, sheet transport devices 16a, 16b and 16c, a fixing device 17, and a toner supply device 18, and forms a toner image on the sheet fed from the sheet feeding device 20 using image information received from the image processor 50.

The sheet feeding device 20 supplies a sheet to the image forming unit 10. That is, the sheet feeding device 20 includes plural sheet loading units which accommodate sheets P of different types (for example, different materials, thicknesses, sheet sizes, or grain sizes), and is configured to supply the sheet fed out in succession from any one of the plural sheet loading units to the image forming unit 10.

The sheet ejection unit 30 ejects the sheet on which an image has been formed by the image forming unit 10. Therefore, the sheet ejection unit 30 includes an ejected sheet receiving unit from which the sheet after image output is ejected. Meanwhile, the sheet ejection unit 30 may have a function of performing a post-processing such as cutting or stapling (stitching) on a sheet bundle output from the image forming unit 10.

The operation display 40 is used for the input of various settings or instructions and for the display of information. That is, the operation display 40 corresponds to a so-called user interface, and specifically, is a combination of a liquid crystal display panel, various operation buttons, a touch panel, and the like.

(1.2) Configuration and Operation of Image Forming Unit

In the image forming apparatus 1 having the configuration described above, the sheet which is fed out in succession from the sheet loading unit designated by a print job for each sheet to be printed during a printing operation in the sheet feeding device 20 is fed to the image forming unit 10 in accordance with the timing of image formation.

The photoconductor unit 13 is provided below the exposure device 12 so that respective photoconductor units are arranged in parallel, and includes a photoconductor drum 31 which is rotationally driven. A charging device 32, the exposure device 12, the developing device 14 as a developing unit, a primary transfer roller 52, and a cleaning device 33 are arranged along the rotation direction of the photoconductor drum 31.

The developing device 14 includes a developing housing 41 which accommodates a developer, a developing roller 42 disposed to face the photoconductor drum 31, an agitation auger 43 which transports toner while agitating the toner so that the toner is mixed with the developer, and a supply auger 44 which supplies the developer to the developing roller 42.

Each developing device 14 is configured substantially in the same manner except for the developer accommodated in the developing housing 41, and forms a corresponding one of toner images of yellow (Y), magenta (M), cyan (C), and black (K).

A replaceable toner cartridge TC which accommodates toner (toner including a carrier) and the toner supply device 18 which guides the insertion and removal of the toner cartridge TC and supplies the toner from each toner cartridge TC to the developing device 14 are disposed above the developing device 14.

The surface of the rotating photoconductor drum 31 is charged by the charging device 32, and an electrostatic latent image is formed by latent image forming light L (see FIG. 2) emitted from the exposure device 12 according to image data generated by the image processor 50. The electrostatic latent image formed on the photoconductor drum 31 is developed to a toner image by the developing roller 42.

The transfer device 15 includes an intermediate transfer belt 51 onto which each color toner image formed on the photoconductor drum 31 of each photoconductor unit 13 is transferred in a multiplex manner, the primary transfer roller 52 which sequentially transfers (primarily transfers) each color toner image formed on each photoconductor unit 13 to the intermediate transfer belt 51, and a secondary transfer belt 53 which collectively transfers (secondarily transfers), onto a sheet, each color toner image which has been transferred onto the intermediate transfer belt 51 in a superimposed manner.

The secondary transfer belt 53 is tensioned by a secondary transfer roller 54 and a separation roller 55, and is sandwiched between a backup roller 65 disposed on the back side of the intermediate transfer belt 51 and the secondary transfer roller 54 to form a secondary transfer section TR.

Each color toner image formed on the photoconductor drum 31 of each photoconductor unit 13 is sequentially electrostatically transferred (primarily transferred) onto the intermediate transfer belt 51 by the primary transfer roller 52 to which a predetermined transfer voltage is applied from, for example, a power supply device (not illustrated) which is controlled by the system control device 11, and a superimposed toner image in which each color toner image is superimposed is formed.

The superimposed toner image on the intermediate transfer belt 51 is transported to the secondary transfer section TR in which the secondary transfer belt 53 is disposed in accordance with movement of the intermediate transfer belt 51. When the superimposed toner image is transported to the secondary transfer section TR, a sheet P is supplied from the sheet feeding device 20 to the secondary transfer section TR in accordance with the transport timing. Then, a predetermined transfer voltage is applied from, for example, the power supply device controlled by the system control device 11 to the backup roller 65 which faces the secondary transfer roller 54 with the secondary transfer belt 53 interposed therebetween, and plural toner images on the intermediate transfer belt 51 are collectively transferred onto the sheet P.

The toner remaining on the surface of the photoconductor drum 31 is removed by the cleaning device 33 and is collected in a waste toner accommodating unit (not illustrated). The surface of the photoconductor drum 31 from which the remaining toner has been removed is re-charged by the charging device 32.

The fixing device 17 includes an endless fixing belt 17a which rotates in one direction and a pressure roller 17b which is in contact with the circumferential surface of the fixing belt 17a and rotates in one direction, and a nip portion (fixing area) is formed by a pressure contact area of the fixing belt 17a and the pressure roller 17b.

The sheet on which the toner image has been transferred in the transfer device 15 is transported to the fixing device 17 by way of the sheet transport device 16a in a state where the toner image is not fixed. The toner image is fixed to the sheet P transported to the fixing device 17 by the action of heating and pressing by a pair of the fixing belt 17a and the pressure roller 17b.

The completely fixed sheet is fed to the sheet ejection unit 30 by way of the sheet transport device 16b.

Furthermore, when image output is performed on both sides of the sheet, the sheet is inverted by the sheet transport device 16c and is fed again to the secondary transfer section TR in the image forming unit 10. Then, after the transfer of the toner image and the fixing of the transferred image are performed, the sheet is fed to the sheet ejection unit 30. The sheet fed to the sheet ejection unit 30 is ejected to the ejected sheet receiving unit after being subjected to a post-processing such as cutting or stapling (stitching) as necessary.

(2) Configuration and Rotational Driving of Toner Cartridge

Figure 3A:
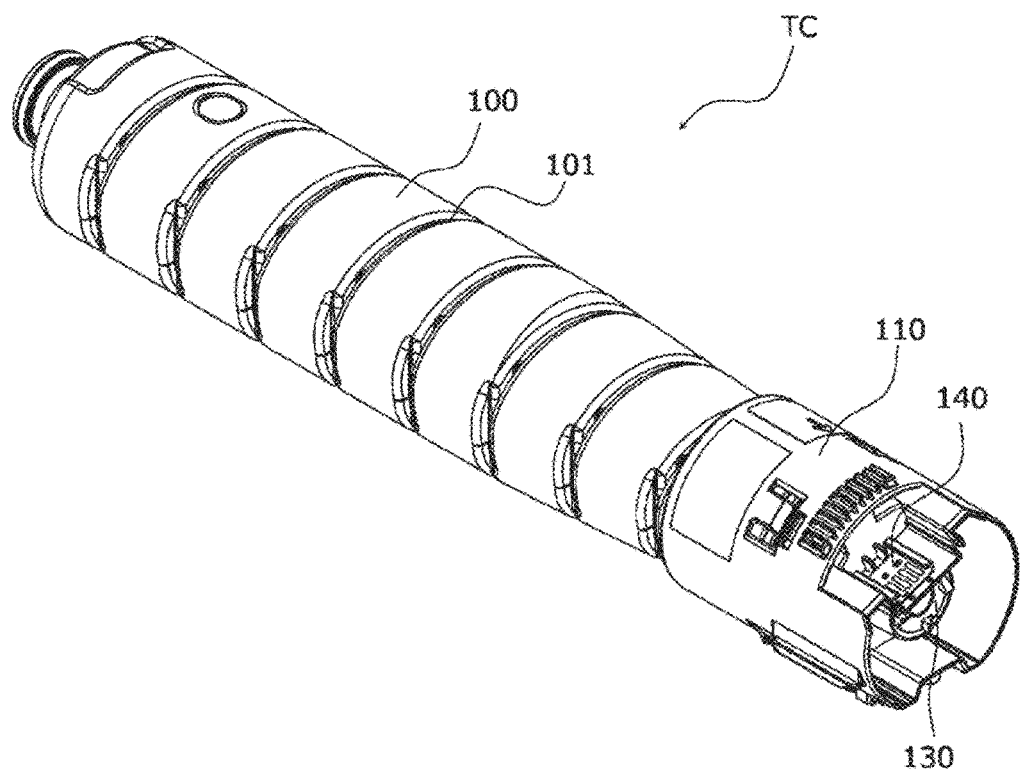
FIGS. 3A and 3B are perspective views illustrating an overall configuration of a toner cartridge.
Figure 3B:
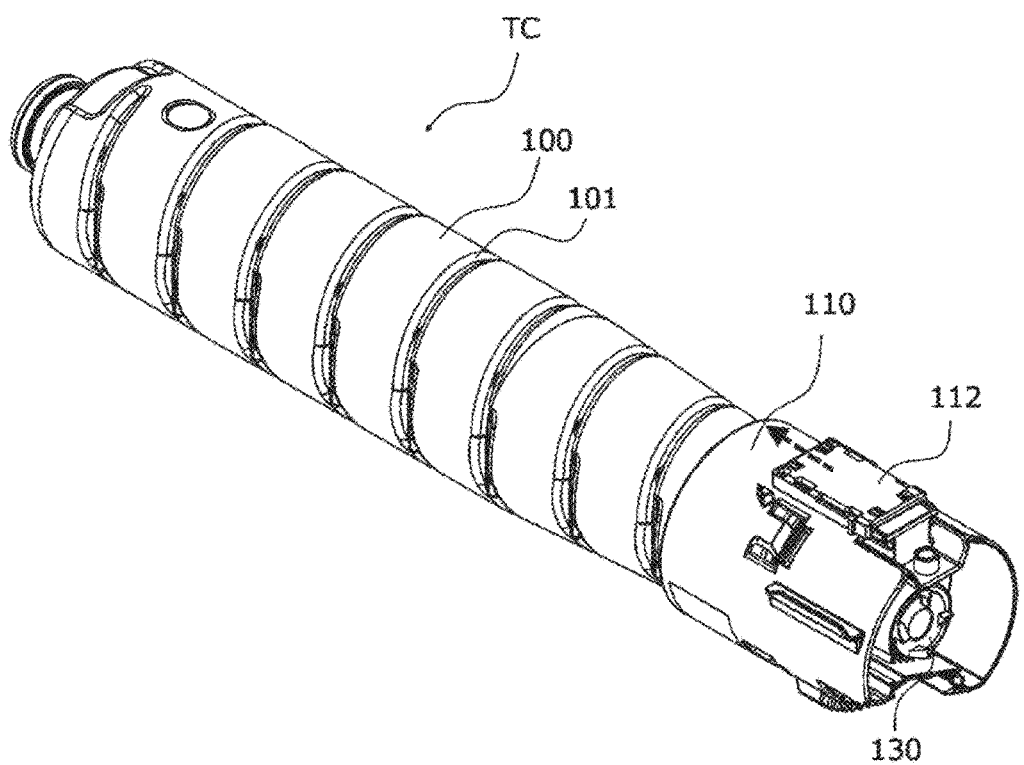
Figure 4:
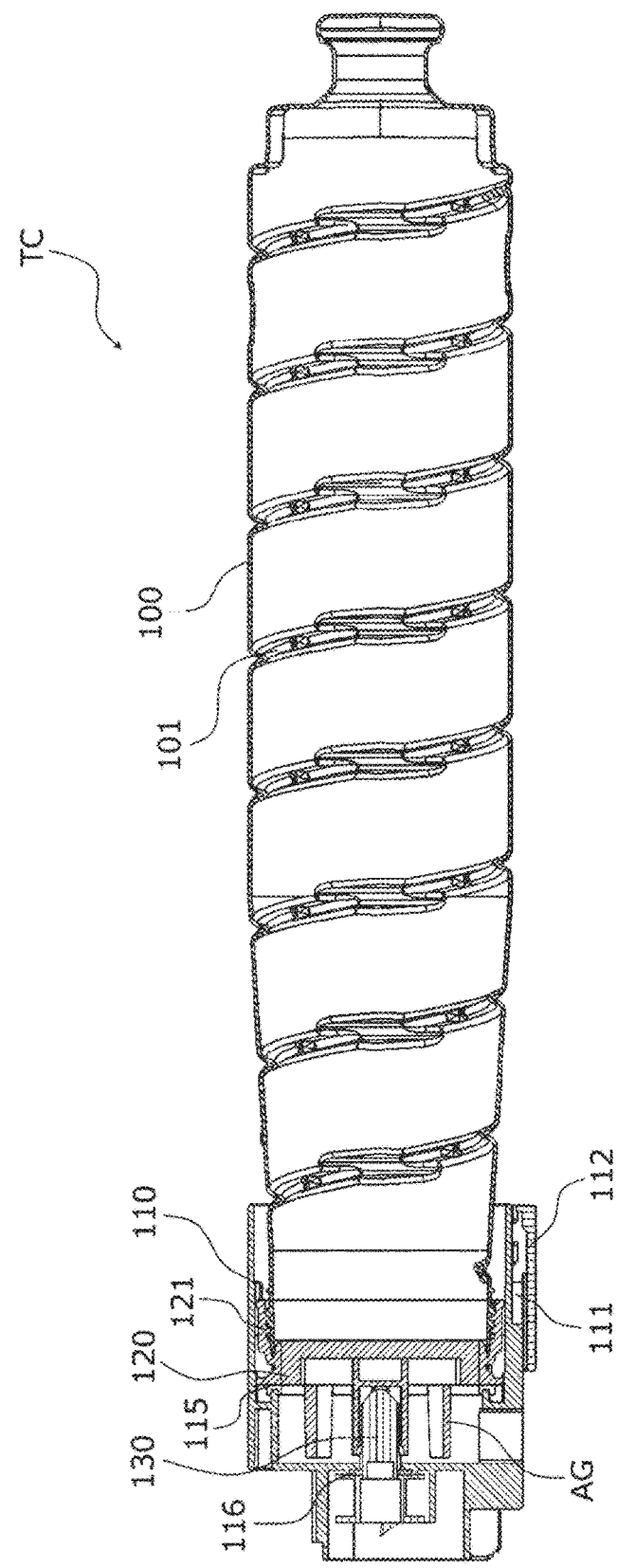
FIG. 4 is a schematic cross-sectional view of the toner cartridge.
Figure 5:
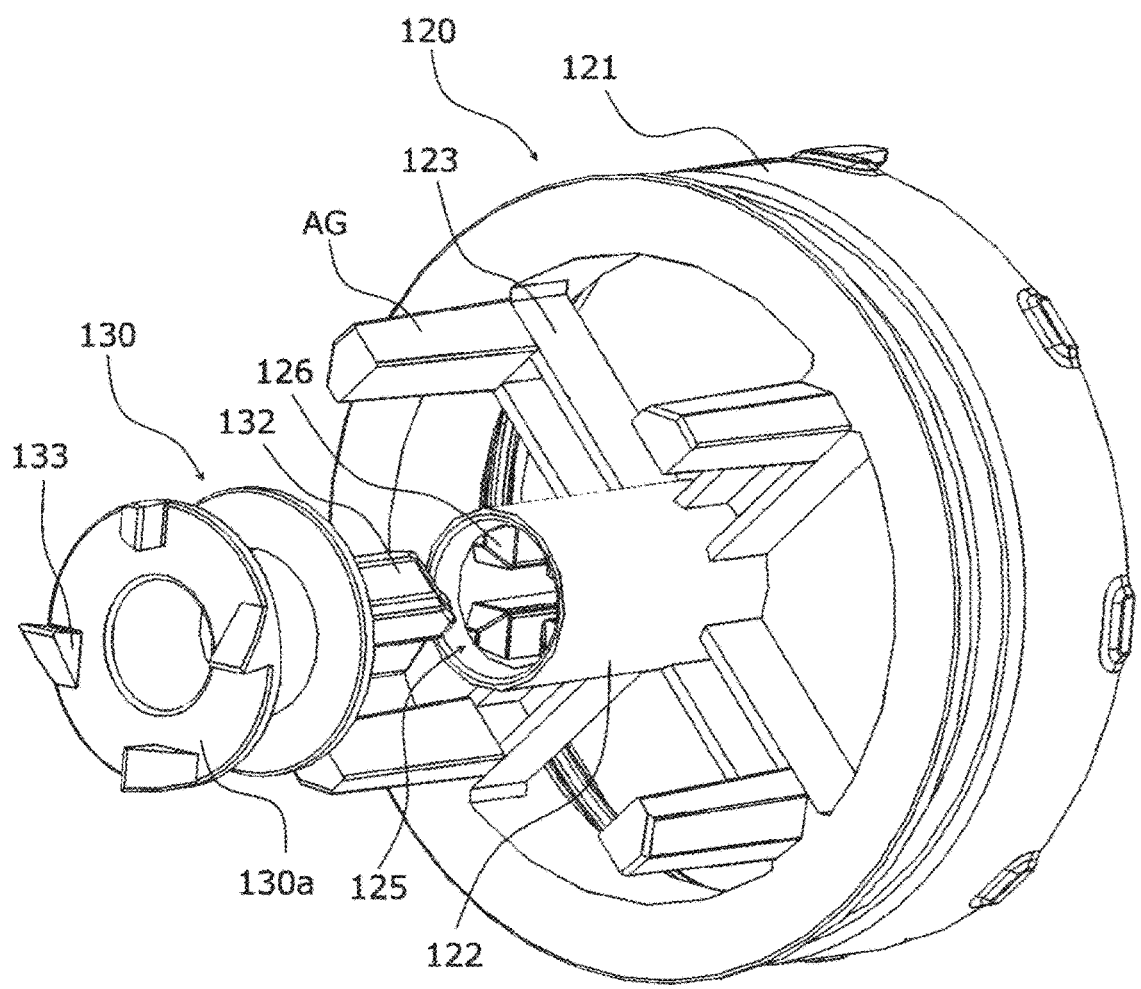
FIG. 5 is a perspective view illustrating a relationship between a transmission member and a coupling gear.
Figure 6:
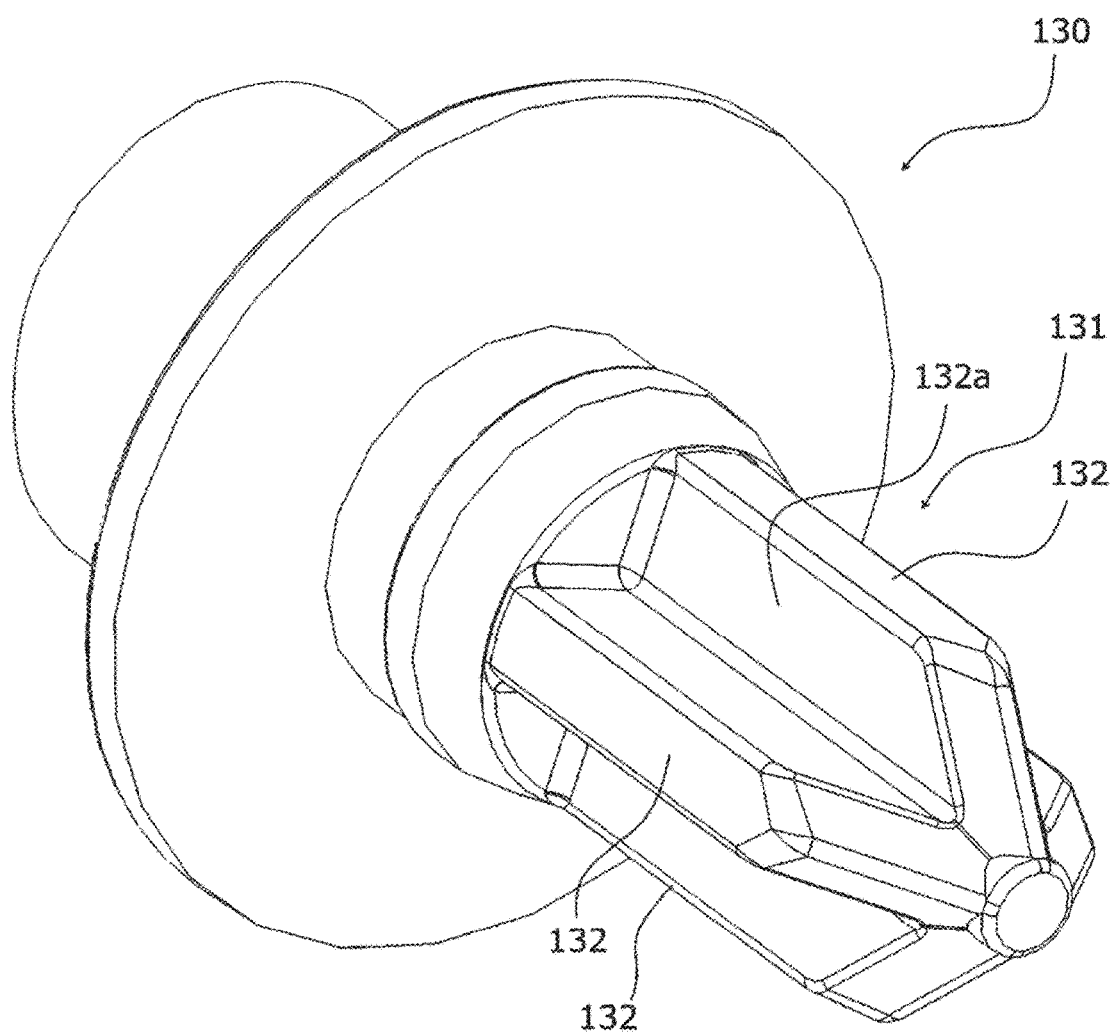
FIG. 6 is a perspective view illustrating a gear portion of the coupling gear.
Figure 7:
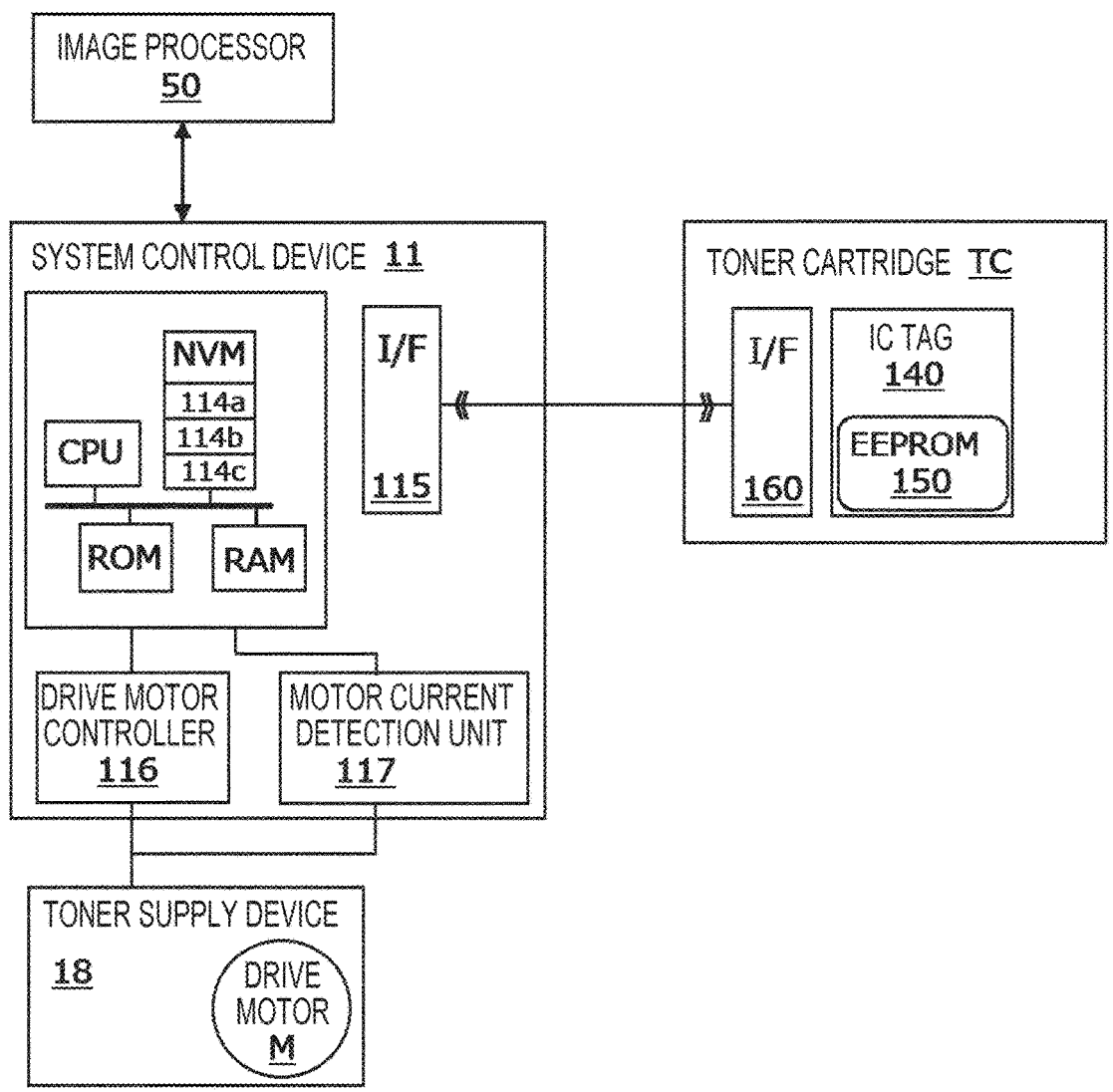
FIG. 7 is a block diagram illustrating a functional configuration of toner supply control.

FIGS. 3A and 3B are perspective views illustrating an overall configuration of the toner cartridge TC, FIG. 4 is a schematic cross-sectional view of the toner cartridge TC, FIG. 5 is a perspective view illustrating a relationship between a transmission member 120 and a coupling gear 130, FIG. 6 is a perspective view illustrating a gear portion of the coupling gear 130, FIG. 7 is a block diagram illustrating a functional configuration of toner supply control, FIG. 8 is a block diagram of a storage area of an IC tag, and FIG. 9 is a side view illustrating a configuration of the toner cartridge, the toner supply device, and a drive motor.

Hereinafter, a configuration and rotational driving of the toner cartridge TC will be described with reference to the drawings.

(2.1) Toner Cartridge

As illustrated in FIGS. 3 and 4, the toner cartridge TC includes a container main body 100, a holding member 110 which rotatably holds the container main body 100, the transmission member 120 which is fixed to the container main body 100 and transmits rotational force from the toner supply device 18 to the container main body 100, the coupling gear 130 which transmits rotational driving force to the transmission member 120, and an IC tag 140 as an example of a storage unit which stores toner identification information and use history information.

The container main body 100 is manufactured by blow molding using polyethylene or polyester resin as a long cylindrical body having a substantially cylindrical shape, one end side of which is closed, and the inner circumferential surface of the cylindrical body is provided with a helical portion 101 in which a helical protrusion is formed from one end side to the other end side of the cylindrical body. The developer accommodated in the cylindrical body may be transported by the helical portion 101 by rotating the cylindrical body in a predetermined direction.

The holding member 110 is manufactured, for example, by injection molding using a synthetic resin such as ABS, and is shaped so as to be fitted into the toner supply device 18 when mounted on the toner supply device 18. Further, when the toner cartridge TC is mounted on the toner supply device 18, an opening and closing lid 112 is pushed by the toner supply device 18 in the direction (see the arrow in FIG. 3B) opposite to the mounting direction, so that an outlet 111 is opened.

The transmission member 120 is manufactured, for example, by injection molding using polypropylene or polyethylene resin, and as illustrated in FIG. 5, includes an outer cylindrical portion 121 having a cylindrical shape, a transmission portion 122 which is provided along the central axis of the outer cylindrical portion 121 and to which rotational driving is transmitted from a drive motor M (see FIG. 9) at the toner supply device 18 side, a support portion 123 which is provided between the transmission portion 122 and the outer cylindrical portion 121 to support the outer cylindrical portion 121, and an agitation member AG which is provided on the support portion 123 at the outlet 111 side of the holding member 110 to agitate the developer.

In the transmission member 120, a recess 125 is formed at a substantially rotational center position in the transmission portion 122, and plural protrusions 126 as a rotational force receiving portion are provided on the inner wall of the recess 125 to extend along the central axis. Then, the coupling gear 130 as a rotational force applying unit which operates in cooperation with the transmission member 120 is inserted into the recess 125 so that rotational driving force is transmitted from the toner supply device 18 to the transmission member 120.

The coupling gear 130 is manufactured, for example, by injection molding using POM resin, and as illustrated in FIG. 6, is formed, at the transmission member 120 side thereof, with a gear portion 131 to be inserted into the recess 125 in the transmission member 120. The gear portion 131 includes four protruding portions 132 which have a cross shape in a cross-sectional view. The coupling gear 130 is formed, at the toner supply device 18 side, with four protrusions 133.

Each protrusion 133 is configured to protrude from a surface 130a of the coupling gear 130 in a substantially triangular shape, thus receiving the rotational driving force from the toner supply device 18.

The transmission member 120 and the coupling gear 130 are configured such that the protrusions 126 of the recess 125 in the transmission member 120 and the protruding portions 132 of the gear portion 131 of the coupling gear 130 are engaged with each other. Therefore, when the coupling gear 130 rotates, the transmission member 120 and the container main body 100 rotate.

The IC tag 140 as an example of a storage unit is attached to the outer periphery of the holding member 110 of the toner cartridge TC. The IC tag 140 includes a non-volatile memory 150 such as an electrically erasable and programmable read only memory (EEPROM) and an interface 160.

When the toner cartridge TC is mounted to a main body of the image forming apparatus 1, the interface 160 of the toner cartridge TC and an interface 115 of the system control device 11 are connected to each other to enable communication therebetween. Although the communication between the system control device 11 and the IC tag 140 is represented as wired communication in FIG. 7, wireless communication may be used.

Then, information in the IC tag 140 is readable and rewritable by a CPU of the system control device 11. The CPU is connected to a RAM, a ROM, a non-volatile memory (NVM), and the interface 115, and performs reading of an operation control program of the image forming apparatus 1 from the ROM and reading and rewriting of information in the RAM and the non-volatile memory (NVM).

The non-volatile memory (NVM) of the system control device 11 includes a first area 114c storing information corresponding to specific information of the IC tag 140, in addition to an area 114a storing various setting information for performing image formation and an area 114b storing the main body serial ID of the image forming apparatus 1.

The non-volatile memory 150 includes a reading area which stores specific information read out from the system control device 11 and a reading and writing area for storing management information to be read or written from or to the system control device 11.

As illustrated functionally in FIG. 8, for example, the reading area may include an area 151 storing the serial ID of the toner cartridge TC which is unique to the toner cartridge TC, an area 152 storing toner color information, and an area 153 storing information on the mode of the image forming apparatus 1.

The reading and writing area may include, for example, an area 154 storing information on an initial current value of the drive motor M to be described later, an area 155 storing information on the current value of the drive motor M in use, an area 156 storing information on the number of printed sheets, an area 157 storing the main body serial ID which uniquely identifies the image forming apparatus 1, and an area 158 storing information on the mode change of the image forming apparatus 1 main body.

(2.2) Rotational Driving of Toner Cartridge

FIG. 9 schematically illustrates the toner cartridge TC mounted on the toner supply device 18 and the drive motor M which rotationally drives the toner cartridge TC. Furthermore, each toner cartridge TC(C), TC(M), TC(Y) or TC(K), each toner supply device 18, and each drive motor M are configured in the same manner, respectively.

The toner supply device 18 has a function of mounting the toner cartridge TC thereon, and is fixed inside the main body of the image forming apparatus 1. Specifically, the toner supply device 18 includes a bottom plate 181 and a pair of side plates (not illustrated) standing upright to the Z side (upper side) from both ends of the bottom plate 181, and has a U-shaped cross-sectional shape when viewed in the Y direction (see FIG. 2).

The bottom plate 181 extends from the back side toward the front side (the −Y direction) of the image forming apparatus 1. The surface of the bottom plate 181 is a surface on which the toner cartridge TC is loaded in the Y direction as an axial direction. The drive motor M is attached to the back side end of the bottom plate 181.

An opening 182 through which the toner discharged from the outlet 111 (see FIG. 4) in the toner cartridge TC passes is formed in the bottom plate 181 closer to the back side (the Y direction) than a region in which the drive motor M is provided. The opening 182 penetrates the bottom plate 181 in the vertical direction (the Z direction), and overlaps with the outlet 111 in the toner cartridge TC when viewed in the vertical direction (the Z direction).

In addition, in the toner supply device 18 in which a recess 183 for opening the opening and closing lid 112 of the toner cartridge TC is formed closer to the back side (the Y direction) than the opening 182 in the bottom plate 181, the toner cartridge TC is moved on the bottom plate 181 to the back side (the Y direction) from the front side (the −Y direction) of the bottom plate 181 and is mounted on the bottom plate 181 of the toner supply device 18. Further, in the toner supply device 18, the mounted toner cartridge TC is moved on the bottom plate 181 to the front side (the −Y direction) and is removed from the toner supply device 18.

The drive motor M includes a main body MA, a drive shaft MB, and a driver (not illustrated). A coupling MC is provided on the tip of the drive shaft MB to axially mesh with the coupling gear 130 of the toner cartridge TC.

In a state where the toner cartridge TC is mounted on the toner supply device 18, the coupling MC meshes with the gear portion 131 of the coupling gear 130 and the rotational driving force of the drive motor M is transmitted to the coupling gear 130.

The drive motor M is configured with a constant voltage control stepping motor having a characteristic in that rotational torque increases as a rotation speed (the number of revolutions) decreases, and an operation of the drive motor M is controlled by the system control device 11 (see FIG. 8). In the present exemplary embodiment, through constant voltage control, a change in the weight of the toner cartridge TC as the load of the drive motor M may be detected as a change in current value.

The toner supply device 18 is provided with a reading unit 184 which reads the IC tag 140 attached to the toner cartridge TC. The reading unit 184 reads identification information and use history information stored in the IC tag 140 via the interface 160 of the IC tag 140, and sends the read information to the system control device 11 (see FIG. 7).

The system control device 11 (see FIG. 7) controls the number of pulses (the number of pulses according to the number of revolutions) input to the driver (not illustrated) of the drive motor M via a drive motor controller 116, thereby controlling the rotation angle, rotation speed, and rotation time of the container main body 100. Then, the system control device 11 functions as a determination unit that determines the state of the container main body 100 based on the current value detected by a motor current detection unit 117.

Specifically, when a toner cartridge TC having no use history (new product) is mounted, a toner remaining amount threshold is set, and when the remaining amount of toner in the container main body 100 is equal to or less than the toner remaining amount threshold, this fact is notified.

Further, when a toner cartridge TC that has been mounted is replaced with a new toner cartridge TC having a use history (old product), a toner remaining amount threshold of the new toner cartridge TC is set based on an initial current value stored in the IC tag 140, and when the remaining amount of toner in the container main body 100 is equal to or less than the toner remaining amount threshold, this fact is notified.

(3) Detection of Remaining Amount of Toner in Toner Cartridge

Figure 10:
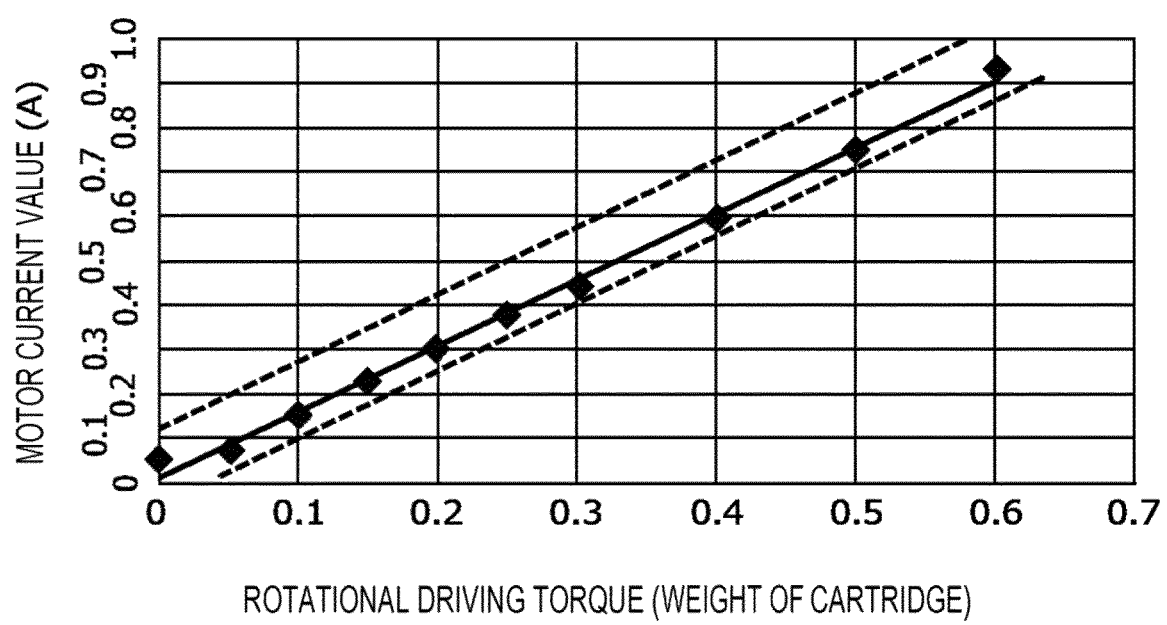
FIG. 10 is a view illustrating an example of a relationship between driving torque of the drive motor and a motor current value.
Figure 11A:
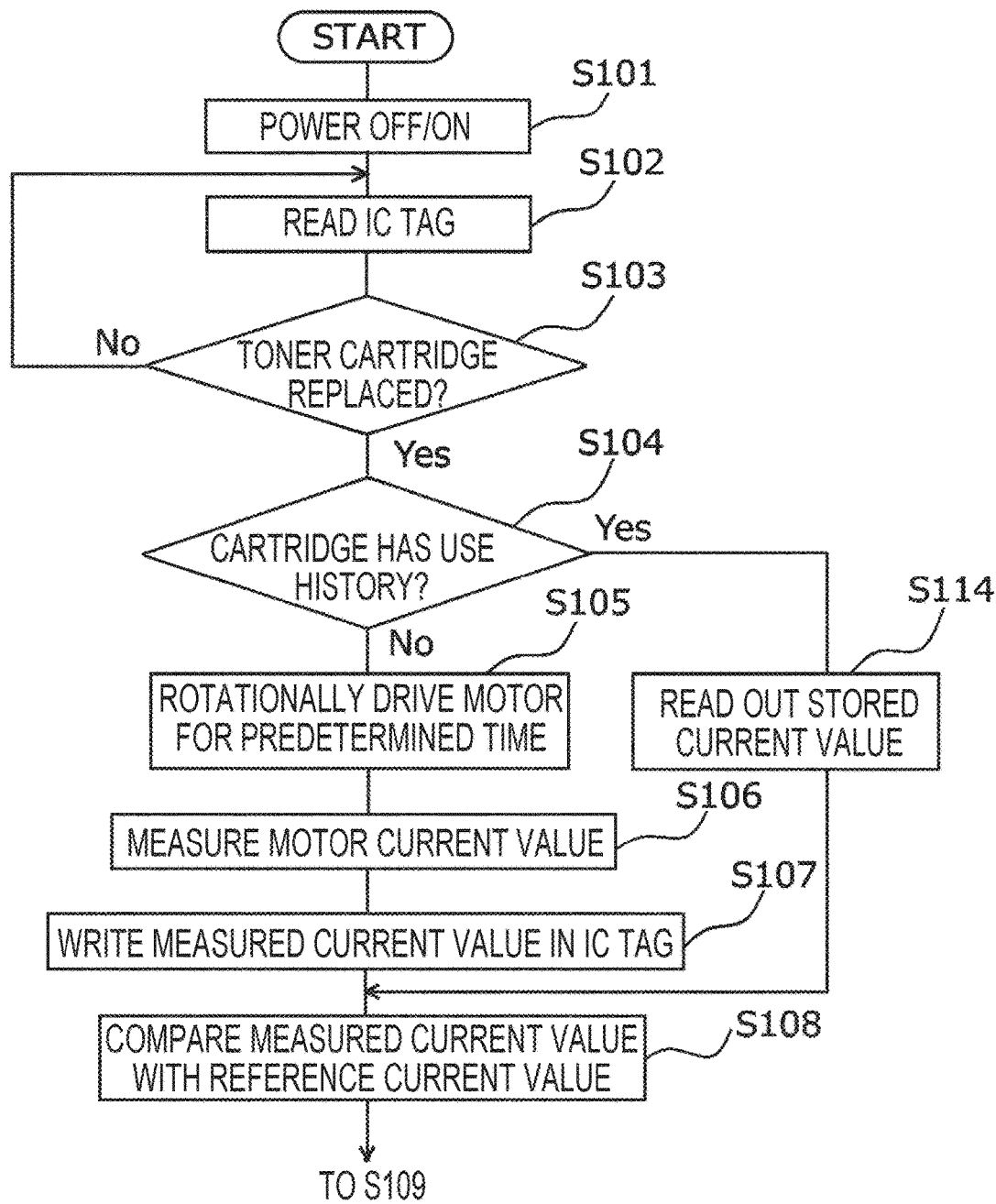
FIGS. 11A and 11B are flowcharts illustrating an operation of detecting a remaining amount of toner in the toner cartridge.
Figure 11B:
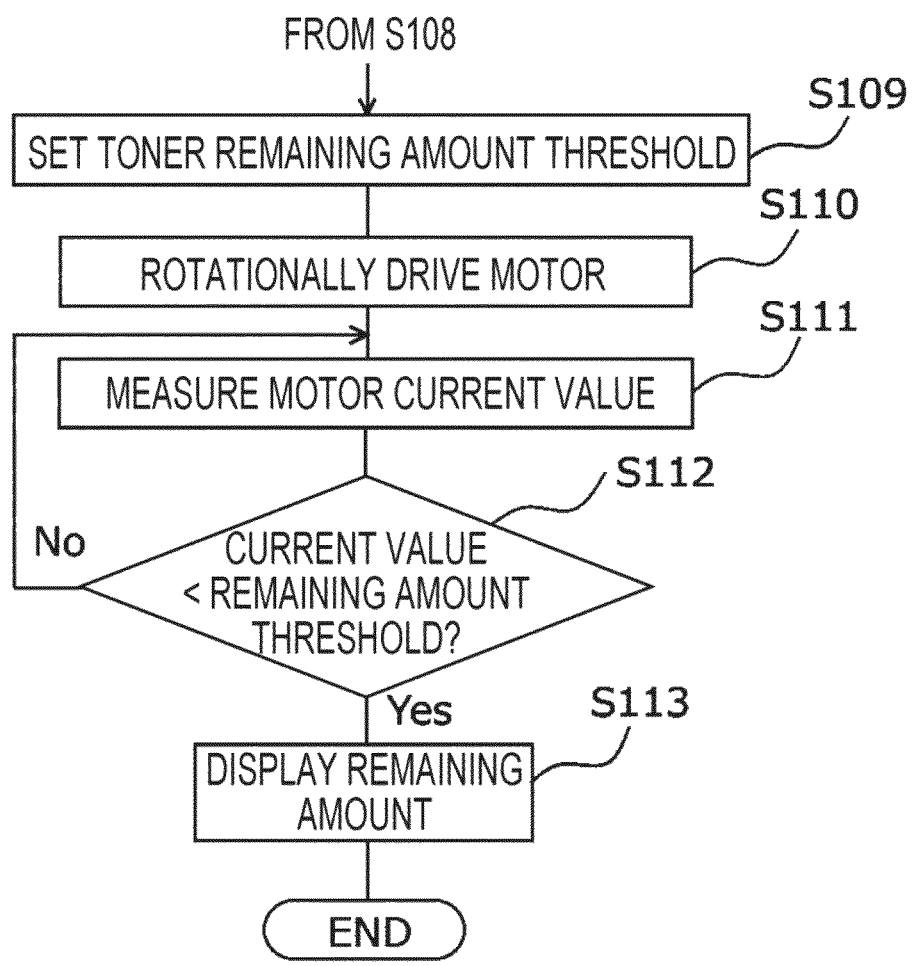

FIG. 10 is a view illustrating an example of a relationship between driving torque of the drive motor M and a motor current value, and FIGS. 11A and 11B are flowcharts illustrating an operation of detecting the remaining amount of toner in the toner cartridge.

In the image forming apparatus 1 according to the present exemplary embodiment, the remaining amount of toner in the container main body 100 is detected based on the current value at the time of operation of the drive motor M of the container main body 100 of the toner cartridge TC.

When the amount of toner in the developing device 14 decreases due to image formation, toner of each color is supplied from the toner cartridge TC to the developing device 14 by way of the toner supply device 18. The supply of toner is appropriately performed based on the concentration of toner (TC) in the developing device 14, the number of printed sheets, or the like. As a result of the toner being supplied to the developing device 14, the remaining amount of toner in the container main body 100 of the toner cartridge TC decreases. When the remaining amount of toner in the container main body 100 decreases, the weight of the container main body 100 decreases, and accordingly, the load of the drive motor M which rotationally drives the container main body 100 decreases.

Accordingly, the system control device 11 may detect the remaining amount of toner in the container main body 100 based on the current value of the drive motor M, and when the remaining amount of toner in the container main body 100 is equal to or less than a toner remaining amount threshold, alert information which notifies this fact is displayed on the operation display 40 which displays a message to a user.

FIG. 10 illustrates an example of a relationship between driving torque as the load of the drive motor M and a motor current value in the image forming apparatus 1 according to the present exemplary embodiment. The weight of the container main body 100 holding the toner is load torque for the drive motor M which is rotationally driven by constant voltage control.

Then, as illustrated in FIG. 10, the current value of the drive motor M which generates the driving torque necessary to rotationally drive the container main body 100 and the weight of the container main body 100 as the load torque have a constant linear relation. Therefore, it is possible to uniquely set a relationship between the motor current value and the weight of the container main body 100 which has the same meaning as the driving torque.

On the other hand, in the toner cartridge TC, the container main body 100 is rotated when the rotational driving force of the drive motor M is transmitted to the transmission member 120. However, due to variation in the assembly of the transmission member 120 or variation in the mounting of the toner cartridge TC to the toner supply device 18, as illustrated by the broken lines in FIG. 10, the magnitude of the driving torque as the load becomes uneven.

In the image forming apparatus 1 according to the present exemplary embodiment, when the toner cartridge TC is mounted, the container main body 100 is first rotationally driven by the drive motor M, and an initial current value of the drive motor M is detected. Then, the ratio (difference) between the detected initial current value and a reference current value which is stored in advance in the system control device 11 is calculated, and a reference remaining amount threshold which is stored in advance is corrected by the calculated ratio (difference) and is set to a toner remaining amount threshold. Therefore, unevenness in the load torque of the toner cartridge TC is corrected.

As illustrated in FIGS. 11A and 11B, when a power supply of the image forming apparatus 1 is turned off or on (S101), the reading unit 184 reads toner identification information and use history information stored in the IC tag 140 (S102), and it is determined whether or not the toner cartridge TC has been replaced (S103). When the toner cartridge TC has been replaced (S103: Yes), it is determined from the use history information of the toner cartridge TC whether or not the replaced toner cartridge is a toner cartridge TC having no use history (new product) (S104).

When the toner cartridge TC is a new product (S104: No), the drive motor M is first rotationally driven for a predetermined time (S105), and a motor current value is measured in a state where the toner in the container main body 100 is agitated (S106). Here, by rotationally driving the drive motor M, for example, for about 10 seconds, an initial current value may be measured in a state where the toner in the container main body 100 is sufficiently agitated. The measured initial current value is written and stored in the area 154 of the IC tag 140 (S107).

Then, the measured initial current value is compared with a reference current value which is stored in advance (S108) to correct unevenness in the load torque of the toner cartridge TC. Specifically, the ratio (difference) between the measured initial current value and the reference current value is calculated, and the calculated ratio (difference) is calculated with a reference remaining amount threshold which is stored in advance to set a toner remaining amount threshold (S109). Thereafter, the drive motor M is rotationally driven (S110), and the current value at that time is measured (S111).

Then, whenever the current value is measured, the remaining amount of toner is determined by comparing the measured current value with the toner remaining amount threshold (S112). When the current value measured in step 111 becomes equal to or less than the toner remaining amount threshold (S112: Yes), this fact is displayed on the operation display 40 (S113).

Here, by appropriately setting the toner remaining amount threshold, for example, the remaining amount of toner may be displayed as a numerical value such as "20% or less". According to the present exemplary embodiment, since the weight of the toner in the container main body 100 which is the load torque of the drive motor M is directly measured by the current value, the remaining amount of toner may be accurately determined compared to a method of predicting the remaining amount of toner by the cumulative rotation time of a transport member. Further, by setting the toner remaining amount threshold to a predetermined remaining amount or less, empty detection may be performed without using a toner detection sensor and the like.

When it is determined in step 104 that the toner cartridge TC has a use history (old product) (S104: Yes), current value information stored in the IC tag 140 is read out (S114). Here, the current value to be read out is an initial current value of the toner cartridge TC and a finally stored current value. Then, the ratio (difference) between the read-out initial current value and the reference current value is calculated, and the calculated ratio (difference) is calculated with the reference remaining amount threshold which is stored in advance to set (change) the toner remaining amount threshold (S109).

Thereafter, the drive motor M is rotationally driven (S110), and a motor current value at that time is measured (S111). The remaining amount of toner is determined by comparing the motor current value with the toner remaining amount threshold whenever the motor current value is measured (S112). When the current value measured in step 111 becomes equal to or less than the toner remaining amount threshold (S112: Yes), this fact is displayed on the operation display 40 (S113). Therefore, even when the toner cartridge TC which has already been used and consumed by a fixed amount is mounted, the amount of toner in the container main body 100 may be detected with high accuracy.

Second Exemplary Embodiment

Figure 12A:
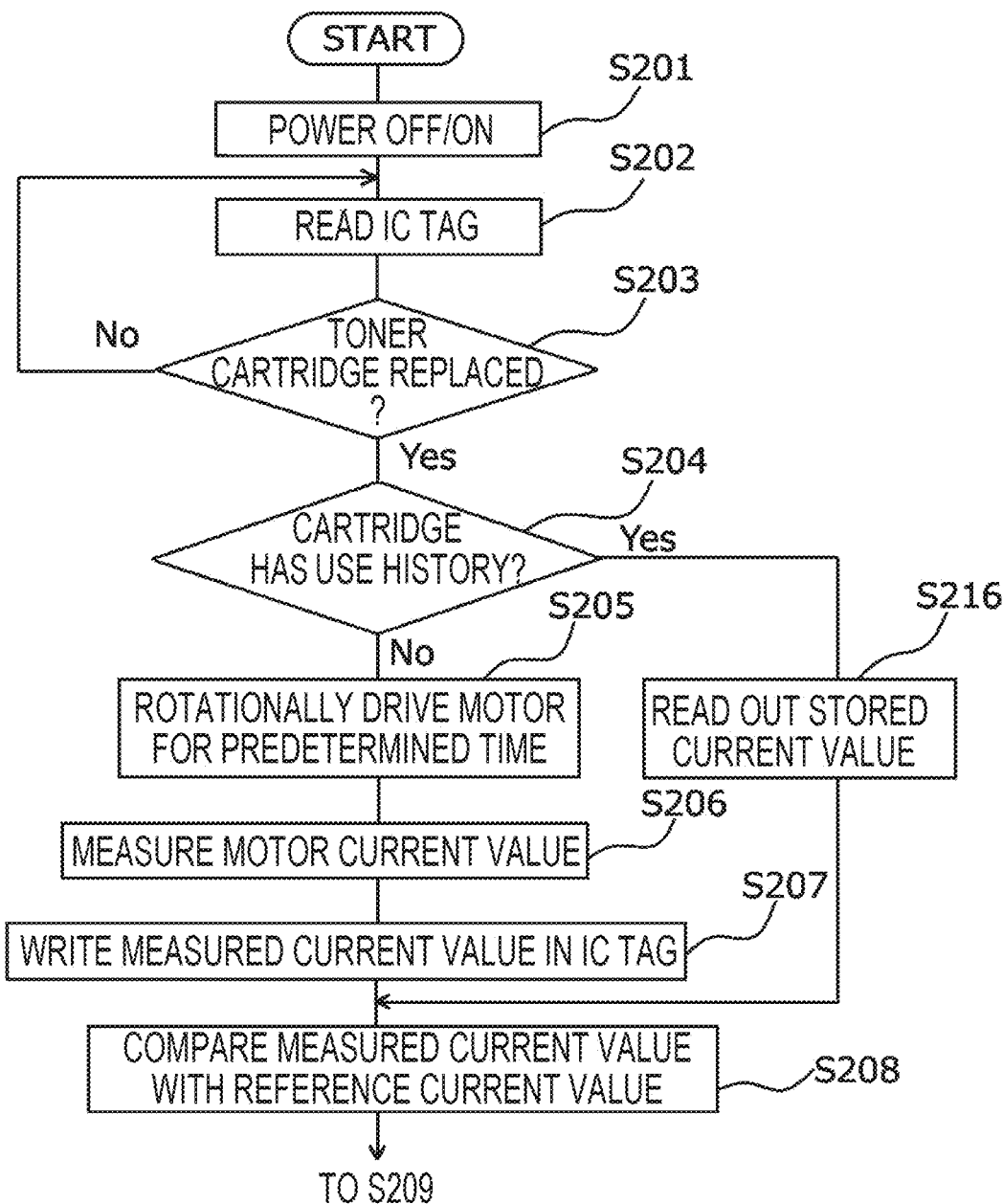
FIGS. 12A and 12B are flowcharts illustrating an operation of detecting the remaining amount of toner in the toner cartridge according to a second exemplary embodiment.
Figure 12B:
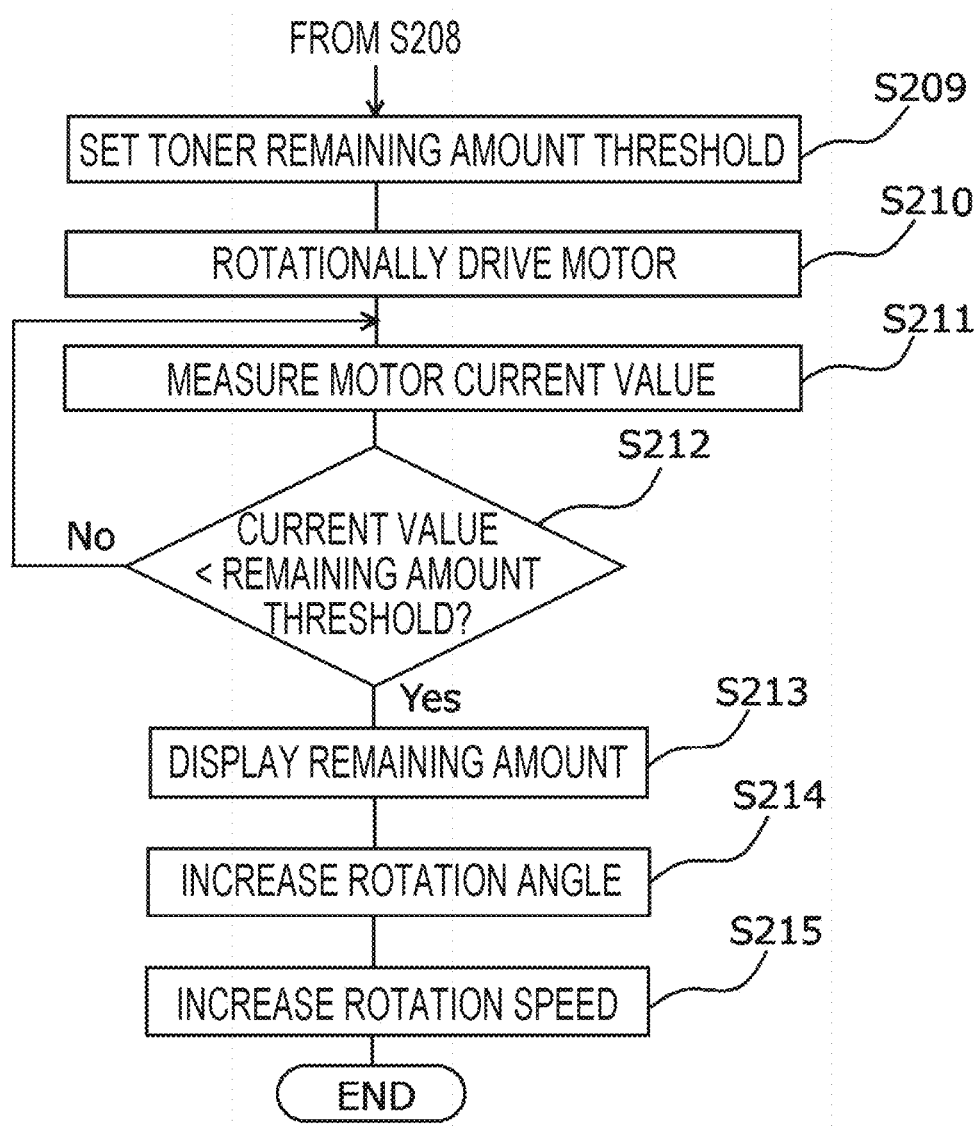

FIGS. 12A and 12B are flowcharts illustrating an operation of detecting the remaining amount of toner in the toner cartridge TC according to a second exemplary embodiment.

Furthermore, the same reference numerals will be given to the same components as those in the first exemplary embodiment, and a detailed description thereof will be omitted here.

In the present exemplary embodiment, when the remaining amount of toner in the container main body 100 is equal to or less than the toner remaining amount threshold, the rotational driving control of the drive motor M is changed. Specifically, the system control device 11 increases the number of revolutions of the drive motor M compared to that at normal times when the remaining amount of toner is equal to or greater than the toner remaining amount threshold. Further, the system control device 11 performs intermittent driving by increasing the rotation angle of the drive motor M compared to that at normal times.

As illustrated in FIGS. 12A and 12B, when the power supply of the image forming apparatus 1 in which the toner cartridge TC is mounted on the toner supply device 18 is turned off or on (S201), the reading unit 184 reads toner identification information and use history information stored in the IC tag 140 (S202). Then, it is determined whether or not the toner cartridge TC has been replaced (S203). When the toner cartridge TC has been replaced (S203: Yes), it is determined from the use history information of the toner cartridge TC whether or not the replaced toner cartridge is a toner cartridge TC having no use history (new product) (S204).

When the toner cartridge TC is a new product (S204: No), the drive motor M is first rotationally driven for a predetermined time (S205), and a motor current value is measured in a state where the toner in the container main body 100 is agitated (S206). Here, when the drive motor M is rotationally driven, for example, for about 10 seconds, an initial current value may be measured in a state where the toner in the container main body 100 is sufficiently agitated. The measured initial current value is written and stored in the area 154 of the IC tag 140 (S207).

Then, the ratio between the measured initial current value and a reference current value which is stored in advance is calculated (S208), and the calculated ratio is calculated with a reference remaining amount threshold which is stored in advance to set a toner remaining amount threshold (S209). Thereafter, the drive motor M is rotationally driven (S210), and a motor current value at that time is measured (S211). The remaining amount of toner is determined by comparing the motor current value with the toner remaining amount threshold whenever the motor current value is measured (S212). When the current value measured in step 212 becomes equal to or less than the toner remaining amount threshold (S212: Yes), this fact is displayed on the operation display 40 (S213).

Then, the rotation angle of the drive motor M is increased compared to that at normal times to perform intermittent driving (S214), and the number of revolutions of the drive motor M is increased compared to that at normal times (S215). For example, in a case where the drive motor M is rotationally driven by 90 degrees at normal times, the rotation angle is increased by 45 degrees so that the drive motor M is intermittently driven by 135 degrees. Further, for example, in a case where the drive motor M is rotated at 10 rpm at normal times, the rotation speed is increased to 20 rpm so that the drive motor M is rotationally driven. Furthermore, any one of the rotation angle and the rotation speed of the drive motor M may be changed without changing the two.

Therefore, the toner which is reduced in remaining amount may be stably discharged from the container main body 100.

The foregoing description of the exemplary embodiments of the present disclosure has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a container configured to accommodate toner therein and be detachably mounted on an image forming apparatus main body;
   a storage unit configured to store
      identification information on the toner accommodated in the container, and
      use history information;
   a drive unit configured to rotationally drive a rotation target constituted by the container to transport the toner to an opening provided in an end of the container;
   a detector configured to detect a current value of the drive unit; and
   a determination unit configured to determine a state of the container based on the current value detected by the detector,
   wherein the determination unit compares the current value of the drive unit detected when the container having no use history is mounted with a reference remaining amount threshold of the toner with respect to a reference current value that is stored in advance in the image forming apparatus main body to set a toner remaining amount threshold of the container.

2. An image forming apparatus comprising:
   a container configured to accommodate toner therein and be detachably mounted on an image forming apparatus main body;
   a storage unit configured to store
      identification information on the toner accommodated in the container, and
      use history information;
   a drive unit configured to rotationally drive a rotation target constituted by the container to transport the toner to an opening provided in an end of the container;
   a detector configured to detect a current value of the drive unit; and
   a determination unit configured to determine a state of the container based on the current value detected by the detector, wherein when the container that has been mounted is replaced with an other container having use history, the determination unit sets a toner remaining amount threshold of the container based on an initial current value of the other container stored in the storage unit.

3. The image forming apparatus according to claim 1, wherein when a remaining amount of the toner in the container is equal to or less than a toner remaining amount threshold, the determination unit causes a display configured to display a message to a user, to display alert information notifying that the remaining amount of the toner in the container is equal to or less than the toner remaining amount threshold.

4. The image forming apparatus according to claim 1, wherein when a remaining amount of the toner in the container is equal to or less than a toner remaining amount threshold, the determination unit changes a rotation control of the drive unit.

5. The image forming apparatus according to claim 4, wherein the determination unit increases the number of revolutions of the drive unit.

6. The image forming apparatus according to claim 4, wherein the determination unit increases a rotation angle of the drive unit to perform intermittent driving.

7. The image forming apparatus according to claim 1, wherein the drive unit comprises a constant voltage control stepping motor.

8. The image forming apparatus according to claim 1, wherein the drive unit comprises a constant voltage control stepping motor.

9. The image forming apparatus according to claim 2, wherein the drive unit comprises a constant voltage control stepping motor.

10. The image forming apparatus according to claim 3, wherein the drive unit comprises a constant voltage control stepping motor.

11. The image forming apparatus according to claim 4, wherein the drive unit comprises a constant voltage control stepping motor.

12. The image forming apparatus according to claim 5, wherein the drive unit comprises a constant voltage control stepping motor.

13. The image forming apparatus according to claim 6, wherein the drive unit comprises a constant voltage control stepping motor.

14. An image forming apparatus comprising:
- a container configured to accommodate toner therein and be detachably mounted on an image forming apparatus main body;
- storage means for storing
  - identification information on the toner accommodated in the container, and
  - use history information;
- drive means for rotationally driving a rotation target constituted by the container to transport the toner to an opening provided in an end of the container;
- detection means for detecting a current value of the drive means; and
- determination means for determining a state of the container based on the current value detected by the detection means,
- wherein the determination means compares the current value of the drive means detected when the container having no use history is mounted with a reference remaining amount threshold of the toner with respect to a reference current value that is stored in advance in the image forming apparatus main body to set a toner remaining amount threshold of the container.

* * * * *